United States Patent
Chen et al.

(10) Patent No.: US 9,830,242 B2
(45) Date of Patent: Nov. 28, 2017

(54) LOADING CALCULATION METHOD AND LOADING CALCULATION SYSTEM FOR PROCESSOR IN ELECTRONIC DEVICE

(71) Applicant: MEDIATEK INC., Hsin-Chu (TW)

(72) Inventors: Ran-How Chen, Hsinchu County (TW); Ming-Fang Tsai, Hsinchu County (TW); Chih-Jen Tsai, Taoyuan (TW); Hsin-Hsien Huang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 87 days.

(21) Appl. No.: 14/882,416

(22) Filed: Oct. 13, 2015

(65) Prior Publication Data
US 2016/0203020 A1 Jul. 14, 2016

Related U.S. Application Data

(60) Provisional application No. 62/103,086, filed on Jan. 14, 2015.

(51) Int. Cl.
*G06F 9/46* (2006.01)
*G06F 17/00* (2006.01)
*G06N 5/00* (2006.01)
*G06N 5/02* (2006.01)
*G06F 11/30* (2006.01)
*G06F 11/00* (2006.01)
*G06F 9/48* (2006.01)

(52) U.S. Cl.
CPC .......... *G06F 11/30* (2013.01); *G06F 9/48* (2013.01); *G06F 9/4843* (2013.01); *G06F 11/00* (2013.01); *G06F 11/3003* (2013.01); *G06F 11/3006* (2013.01); *G06F 11/3024* (2013.01); *G06N 5/00* (2013.01); *G06N 5/02* (2013.01); *G06N 5/022* (2013.01)

(58) Field of Classification Search
None
See application file for complete search history.

(56) References Cited

U.S. PATENT DOCUMENTS 9,244,682 B2 * 1/2016 Rowles ............... G06F 9/06
2004/0123297 A1 * 6/2004 Flautner ............. G06F 1/3203
718/102

(Continued)

OTHER PUBLICATIONS

Wybranietz et al, "Monitoring and Performance Measuring Distributed Systems During Operation", 1988, ACM, pp. 197-206.*

*Primary Examiner* — Charles Swift
(74) *Attorney, Agent, or Firm* — Oblon, McClelland, Maier & Neustadt, L.L.P.

(57) ABSTRACT

The present invention provides a loading calculation method and a loading calculation system for a processor in an electronic device is disclosed. The loading calculation system comprises: a detecting unit, a determining unit, a generating unit, and a calculating unit. The loading calculation method comprises: detecting a plurality of switching actions of the processor to generate a detecting result; determining a time interval to separate the detecting result to generate a plurality of time periods; generating a log file of scheduling according to the detecting result and the plurality of time periods; utilizing the processor for enabling the log file of scheduling; and calculating the processor loading according to the log file of scheduling.

10 Claims, 4 Drawing Sheets

(56) References Cited

U.S. PATENT DOCUMENTS

| | | | |
|---|---|---|---|
| 2004/0193827 A1* | 9/2004 | Mogi | G06F 9/5083 711/170 |
| 2004/0249601 A1* | 12/2004 | Circenis | G06F 11/3423 702/178 |
| 2006/0123253 A1* | 6/2006 | Morgan | G06F 1/3228 713/300 |
| 2008/0104610 A1* | 5/2008 | Norton | G06F 11/3419 718/108 |
| 2008/0229127 A1* | 9/2008 | Felter | G06F 1/3203 713/320 |
| 2008/0271043 A1* | 10/2008 | Kim | G06F 11/3423 718/108 |
| 2010/0332856 A1* | 12/2010 | Song | G06F 1/3203 713/300 |
| 2012/0137295 A1* | 5/2012 | Soetemans | G06F 9/524 718/100 |
| 2012/0143795 A1* | 6/2012 | Han | G06F 11/079 706/12 |
| 2014/0122403 A1* | 5/2014 | Huang | G06Q 10/04 706/45 |
| 2014/0196050 A1* | 7/2014 | Yu | G06F 9/5088 718/104 |
| 2015/0121103 A1* | 4/2015 | Kanemasa | G06F 1/324 713/322 |
| 2016/0011925 A1* | 1/2016 | Kulkarni | H04L 43/0817 714/57 |

\* cited by examiner

LOADING CALCULATION METHOD AND LOADING CALCULATION SYSTEM FOR PROCESSOR IN ELECTRONIC DEVICE

CROSS REFERENCE TO RELATED APPLICATIONS

This application claims the benefit of U.S. Provisional Application No. 62/103,086, filed on Jan. 14, 2015 and included herein by reference.

BACKGROUND

The disclosed embodiments of the present invention relate to a loading calculation method and a loading calculation system, and more particularly, to a loading calculation method and a loading calculation system capable of precisely calculating the loading of the processor by detecting the switching actions of the processor and the log file thereof.

In general, a conventional loading calculation method for a CPU in an electronic device (such as a smartphone, a tablet, a laptop, a PC, or a handheld computing device) uses the sampling method. For example, the conventional loading calculation method uses the global variable jiffies in the Linux Kernel to record the number of ticks that have occurred since the system booted, wherein ticks is equal to 1/Hz. For example, when Hz=100, ticks=0.01 or 10 micro seconds.

When a higher loading calculating precision is required, Hz has to be higher. For example, when Hz is raised from 100 to 1000, the loading calculating precision will be 10 times higher. However, since the value of Hz determines the number of timer interrupts, a higher value of Hz means that the CPU has to process more timer interrupts. Thus, the conventional loading calculation method has problems of causing additional loading to the CPU when higher loading calculating precision is required.

SUMMARY

It is therefore one of the objectives of the present invention to provide a loading calculation method and a loading calculation system for a processor in an electronic device, so as to solve the above-mentioned problem.

In accordance with an embodiment of the present invention, a loading calculation method for a processor in an electronic device is disclosed. The loading calculation method comprises: detecting a plurality of switching actions of the processor to generate a detecting result; determining a time interval to separate the detecting result to generate a plurality of time periods; generating a log file of scheduling according to the detecting result and the plurality of time periods; utilizing the processor for enabling the log file of scheduling; and calculating the processor loading according to the log file of scheduling.

In accordance with an embodiment of the present invention, a loading calculation system for a processor in an electronic device is disclosed. The loading calculation system comprises: a detecting unit, a determining unit, a generating unit, and a calculating unit. The detecting unit is coupled to the processor, and utilized for detecting a plurality of switching actions of the processor to generate a detecting result. The determining unit is coupled to the detecting unit, and utilized for determining a time interval to separate the detecting result to generate a plurality of time periods. The generating unit is coupled to the determining unit, and utilized for generating a log file of scheduling according to the detecting result and the plurality of time periods. The calculating unit is coupled to the generating unit, and utilized for calculating the processor loading according to the log file of scheduling.

Briefly summarized, the a loading calculation method and a loading calculation system disclosed by the present invention can calculate the loading of the processor by detecting the switching actions of the processor and the log file thereof, instead of using the sampling method which causes additional loading to the processor when a higher loading calculating precision is required.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
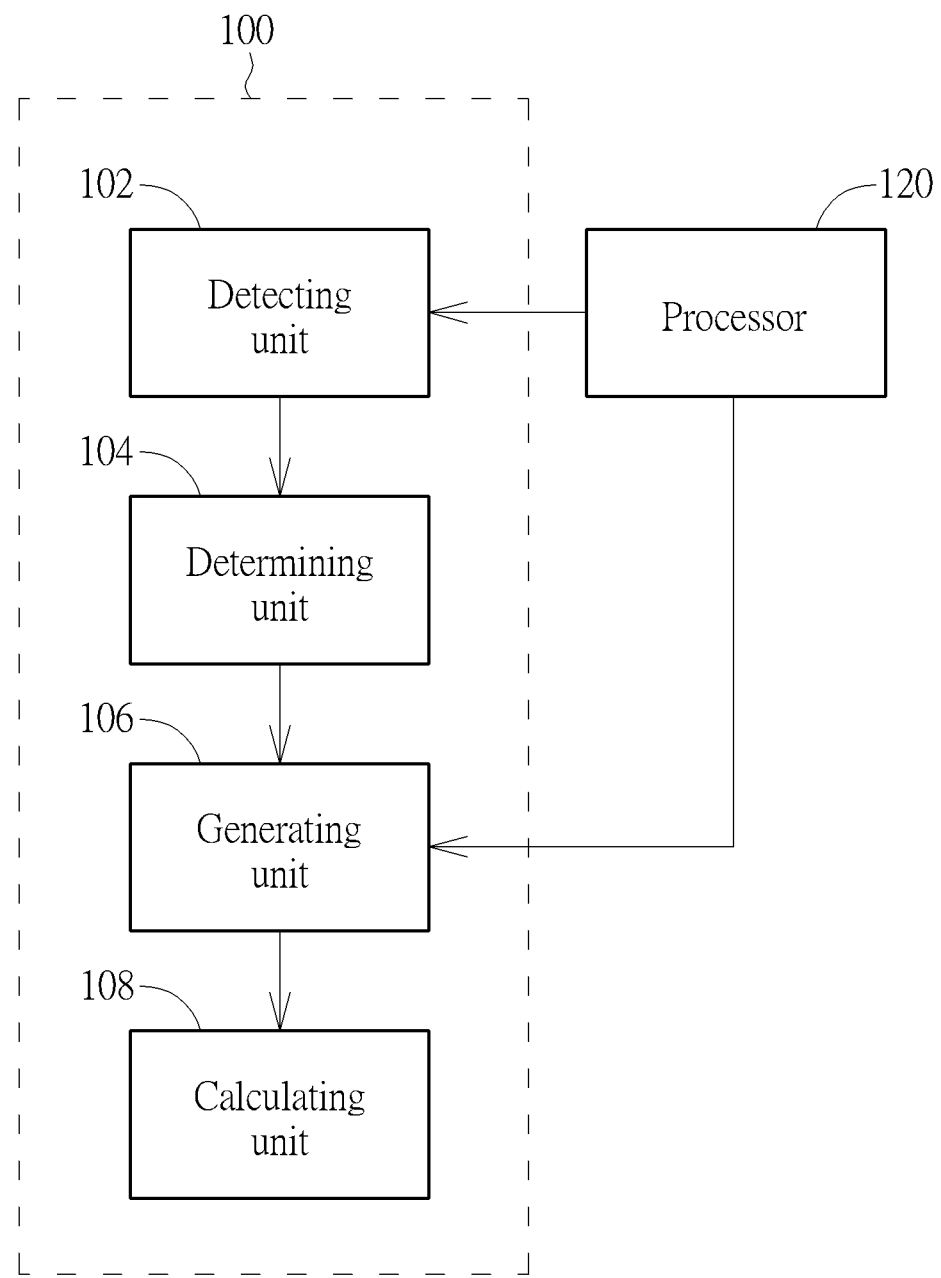
FIG. 1 is a simplified diagram of a loading calculation system for a processor in accordance with an embodiment of the present invention.

Please refer to FIG. 1. FIG. 1 is a simplified diagram of a loading calculation system 100 for a processor 120 in accordance with an embodiment of the present invention, wherein the processor 120 can a be CPU applied to an electronic device (such as a smartphone, a tablet, a laptop, a PC, or a handheld computing device). As shown in FIG. 1, the loading calculation system 100 comprises: a detecting unit 102, a determining unit 104, a generating unit 106, and a calculating unit 108. The detecting unit 102 is coupled to the processor 120, and utilized for detecting a plurality of switching actions of the processor 120 to generate a detecting result. The function of the detecting unit 102 of detecting the plurality of switching actions of the processor 120 to generate the detecting result comprises: if the plurality of switching actions of the processor 120 is detected, determining a plurality of non-idle events and idle events of the processor 120.

The determining unit 104 is coupled to the detecting unit 102, and utilized for determining a time interval to separate the detecting result to generate a plurality of time periods. The function of the determining unit 104 of determining the time interval to separate the detecting result to generate the plurality of time periods comprises: if a first switching action of the processor 120 is detected, determining a starting time point of a first time period; and determining an end time point of the first time period and a starting time point of a second time period according to the time interval.

The generating unit 106 is coupled to the determining unit 104, and utilized for generating a log file of scheduling according to the detecting result and the plurality of time periods. The processor 120 is coupled to the generating unit 106, and utilized for enabling the log file of scheduling. The calculating unit 108 is coupled to the generating unit 106, and utilized for calculating the processor 120 loading according to the log file of scheduling. The function of the calculating unit 108 of calculating the processor 120 loading according to the log file of scheduling comprises: calculating executing time of at least one of the non-idle events of the processor 120 during each of the plurality of time periods; and during each time period, determining a ratio between the non-idle event executing time in each time period and the time interval to generate the processor 120 loading of each time period.

Figure 2:
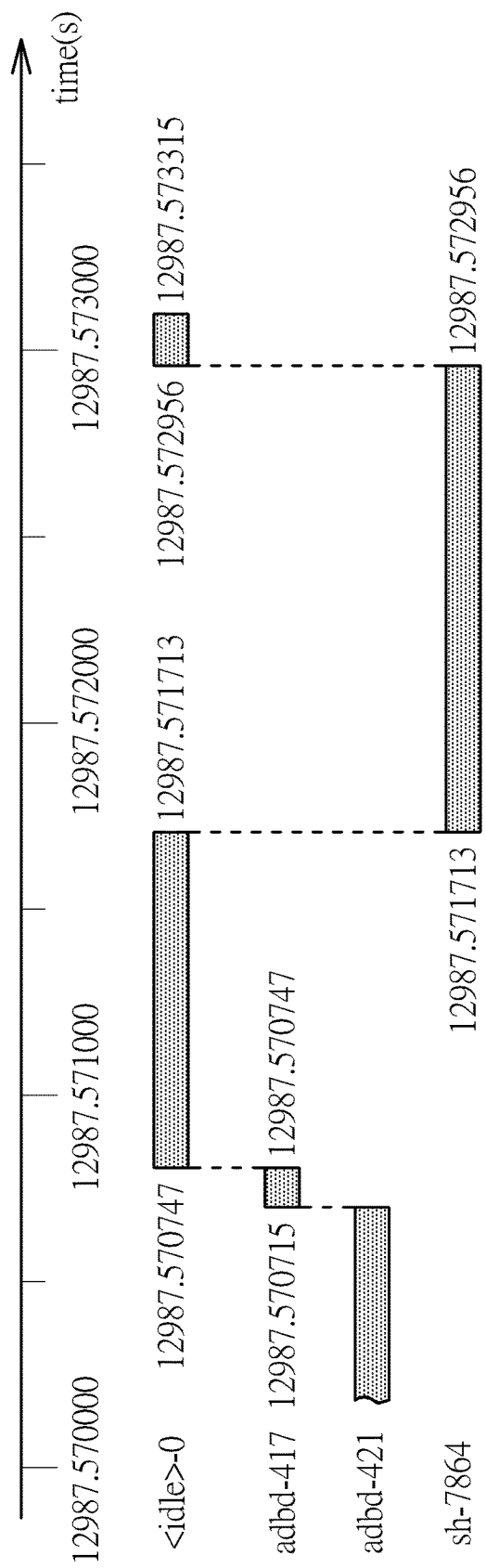
FIG. 2 is a timing diagram illustrating an exemplary embodiment of a loading calculation for the processor performed by the loading calculation system in FIG. 1.
Figure 3:
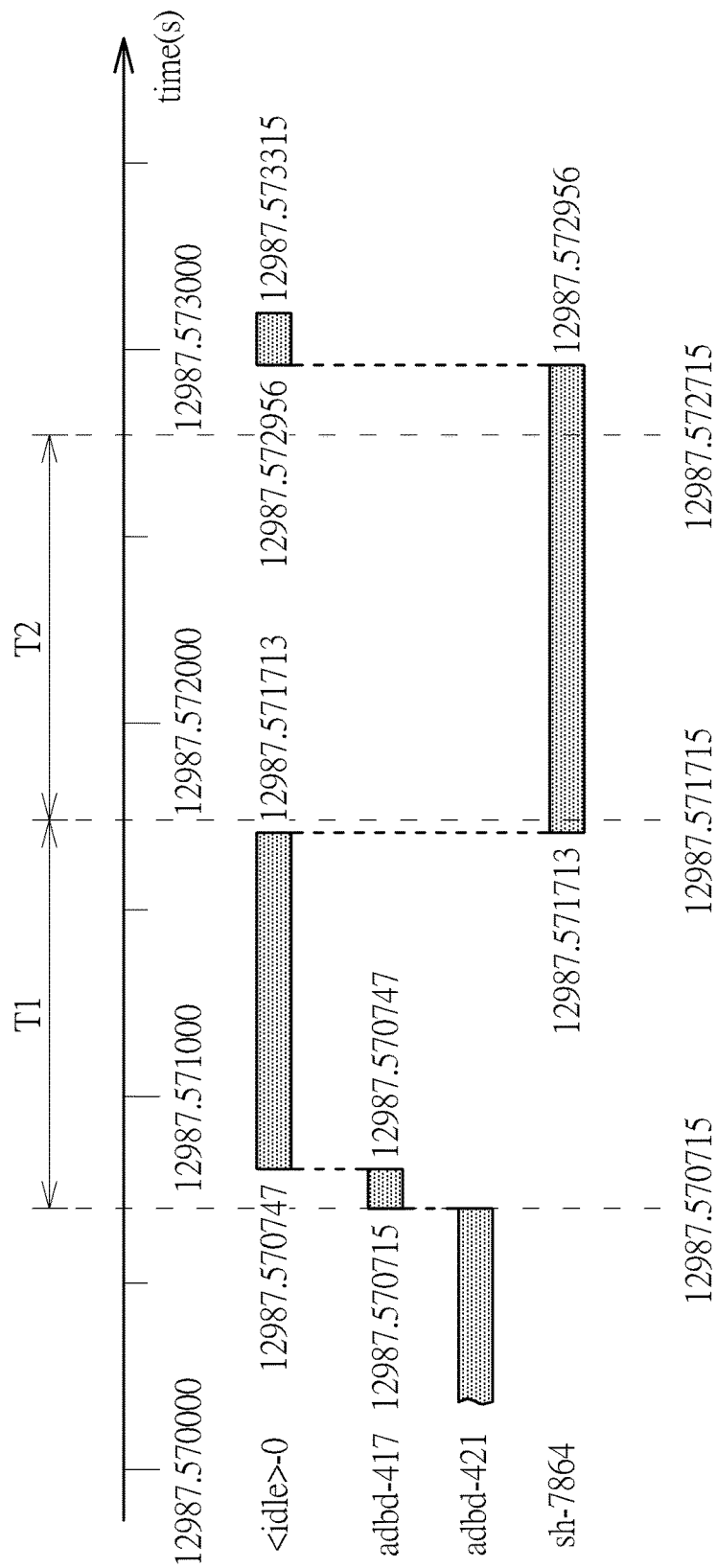
FIG. 3 is a timing diagram illustrating an exemplary embodiment of a loading calculation for the processor performed by the loading calculation system in FIG. 1.

For example, please refer to FIG. 2 and FIG. 3. FIG. 2 and FIG. 3 are timing diagrams illustrating an exemplary embodiment of a loading calculation for the processor 120 performed by the loading calculation system 100 in FIG. 1. As shown in FIG. 2, the detecting unit 102 is utilized for detecting a plurality of switching actions of the processor 120 to generate a detecting result, wherein a first switching action of the processor 120 is detected at 12987.570715 second from a non-idle event adbd-421 to a non-idle event adbd-417, a second switching action of the processor 120 is detected at 12987.570747 second from the non-idle event adbd-417 to an idle event <idle>-0, a third switching action of the processor 120 is detected at 12987.571713 second from the idle event <idle>-0 to a non-idle event sh-7864, and a fourth switching action of the processor 120 is detected at 12987.572956 second from the non-idle event sh-7864 to the idle event <idle>-0.

Next, the determining unit 104 is utilized for determining a time interval of 1000 micro seconds to separate the detecting result to generate a two time periods T1 and T2, as shown in FIG. 3. The determining unit 104 determines a starting time point of the time period T1 to be at 12987.570715 second since the first switching action of the processor 120 is detected at 12987.570715 second, and the determining unit 104 determines an end time point of the time period T1 and a starting time point of the time period T2 to be at 12987.571715 second and determines an end time point of the time period T2 to be at 12987.572715 second according to the time interval.

Next, the generating unit 106 is utilized for generating a log file of scheduling according to the detecting result and the time periods T1 and T2, and the processor 120 is utilized for enabling the log file of scheduling. The calculating unit 108 calculates executing time of the non-idle event adbd-417 and the non-idle event sh-7864 of the processor 120 during the time period T1 to be 34 micro seconds (12987.570747−12987.570715+12987.571715−12987.571713=34), and calculates executing time of the non-idle event adbd-417 and the non-idle event sh-7864 of the processor 120 during the time period T1 to be 1000 micro seconds (12987.572715−12987.571715=1000). The calculating unit 108 determines a ratio between the non-idle event executing time in the time period T1 and the time interval to generate the loading of the processor 120 to be 34% in the time period T1 (34/1000×100%=34%). The calculating unit 108 determines a ratio between the non-idle event executing time in the time period T2 and the time interval to generate the loading of the processor 120 to be 100% in the time period T2 (1000/1000×100%=34%). Please note that the above embodiment is only for an illustrative purpose and is not meant to be a limitation of the present invention. For example, the time interval and the number of the time periods can be changed according to different design requirements.

Figure 4:
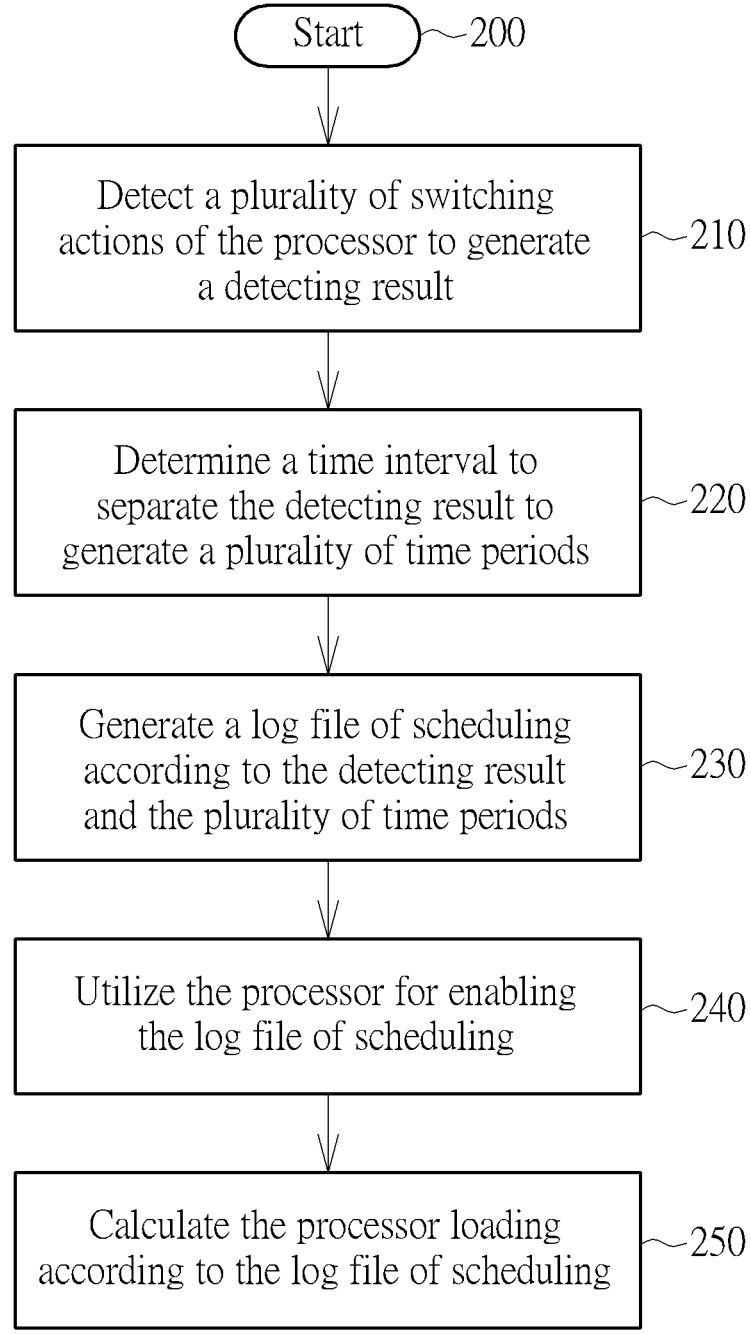
FIG. 4 is a flowchart showing a processor loading calculation method in accordance with the operation schemes of the loading calculation system for the processor in FIG. 1.

Please refer to FIG. 4. FIG. 4 is a flowchart showing a processor loading calculation method in accordance with the operation schemes of the loading calculation system 100 for the processor 120 in the above embodiment. Provided that the result is substantially the same, the steps in FIG. 4 are not required to be executed in the exact order shown in FIG. 4. The processor loading calculation method in accordance with the above embodiment of the loading calculation system 100 in the present invention comprises the following steps:

Step 200: Start.

Step 210: Detect a plurality of switching actions of the processor to generate a detecting result Step 220: Determine a time interval to separate the detecting result to generate a plurality of time periods.

Step 230: Generate a log file of scheduling according to the detecting result and the plurality of time periods.

Step 240: Utilize the processor for enabling the log file of scheduling.

Step 250: Calculate the processor loading according to the log file of scheduling.

In addition, the step 210 of detecting the plurality of switching actions of the processor to generate the detecting result comprises: if the plurality of switching actions of the processor is detected, determining a plurality of non-idle events and idle events of the processor. The step 220 of determining the time interval to separate the detecting result to generate the plurality of time periods comprises: if a first switching action of the processor is detected, determining a starting time point of a first time period; and determining an end time point of the first time period and a starting time point of a second time period according to the time interval. The step 250 of calculating the processor loading according to the log file of scheduling comprises: calculating executing time of at least one of the non-idle events of the processor during each of the plurality of time periods; and during each time period, determining a ratio between the non-idle event executing time in each time period and the time interval to generate the processor loading of each time period.

Briefly summarized, the a loading calculation method and a loading calculation system disclosed by the present invention can calculate the loading of the processor by detecting the switching actions of the processor and the log file thereof, instead of using the sampling method which causes additional loading to the processor when a higher loading calculating precision is required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A loading calculation method for a processor in an electronic device, comprising:
   detecting a plurality of event-switching actions of the processor;
   identifying, by circuitry of the electronic device, a plurality of time points that correspond to the plurality of detected event-switching actions of the processor, respectively;
   after identifying the plurality of time points, identifying plural calculation periods that overlap the plurality of identified time points;
   generating, by the circuitry of the electronic device, a log file that includes information indicating the identified time points, the detected event-switching actions, and the identified calculation periods; and
   after access to the log file is enabled by the processor, calculating a processor loading according to the information included in the log file.

2. The loading calculation method of claim 1, further comprising:
   identifying a plurality of non-idle events and idle events of the processor corresponding to the detected event-switching actions.

3. The loading calculation method of claim 1, wherein identifying the calculation periods that overlap the plurality of identified time points comprises:
   setting a first time point corresponding to a first even-switching action of the processor as a starting time point of a first calculation period;
   setting an end time point of the first calculation period to be separated from the first time point by a predetermined time interval; and
   setting the end time point of the first calculation period as starting time point of a second calculation period.

4. The loading calculation method of claim 2, wherein calculating the processor loading according to the information included in the log file comprises:
   calculating executing time of the non-idle events of the processor that falls within each of the calculation periods; and
   for each calculation period, determining a ratio between the non-idle event executing time in the corresponding calculation period and a time interval of the corresponding calculation period to generate the processor loading of each calculation period.

5. A loading calculation apparatus for a processor in an electronic device, comprising:
   circuitry configured to:
      detect a plurality of event-switching actions of the processor;
      identify a plurality of time points that correspond to the plurality of detected event-switching actions of the processor, respectively;
      after identifying the plurality of time points, identify plural calculation periods that overlap the plurality of identified time points;
      generate a log file that includes information indicating the plurality of identified time points, the detected event-switching actions, and the identified calculation periods; and
      calculate a processor loading according to the information included in the log file.

6. The loading calculation apparatus of claim 5, wherein the circuitry is configured to calculate the processor loading according to the information included in the log file after access to the log file is enabled by the processor.

7. The loading calculation apparatus of claim 5, wherein the circuitry is further configured to:
   identity a plurality of non-idle events and idle events of the processor corresponding to the detected event-switching actions.

8. The loading calculation apparatus of claim 5, wherein the circuitry, when identifying the calculation periods that overlap the plurality of identified time points, is further configured to:
   setting a first time point corresponding to a first even-switching action of the processor as a starting time point of a first calculation period;
   setting an end time point of the first calculation period to be separated from the first time point by a predetermined time interval; and
   setting the end time point of the first calculation period as a starting time point of a second calculation period.

9. The loading calculation apparatus of claim 7, wherein the circuitry, when calculating the processor loading according to the information included in the log file, is further configured to:
   calculate executing time of the non-idle events of the processor that falls within each of the calculation periods; and
   for each calculation period, determine a ratio between the non-idle event executing time in the corresponding calculation period and a time interval of the corresponding calculation period to generate the processor loading of each calculation period.

10. The loading calculation apparatus of claim 5, wherein the processor is a Central Processing Unit (CPU) of the electronic device.

* * * * *